US012612297B2

(12) United States Patent
Tschannen

(10) Patent No.: US 12,612,297 B2
(45) Date of Patent: Apr. 28, 2026

(54) METERING MACHINE FOR FILLING FREE-FLOWING MEDIA INTO CAVITIES

(71) Applicant: Nera Technologies AG, Wil SG (CH)

(72) Inventor: Joel Tschannen, Schaffhausen (CH)

(73) Assignee: Nera Technologies AG (CH)

(*) Notice: Subject to any disclaimer, the term of this patent is extended or adjusted under 35 U.S.C. 154(b) by 27 days.

(21) Appl. No.: 18/691,359

(22) PCT Filed: Jul. 18, 2022

(86) PCT No.: PCT/EP2022/070084
§ 371 (c)(1),
(2) Date: Mar. 12, 2024

(87) PCT Pub. No.: WO2023/041223
PCT Pub. Date: Mar. 23, 2023

(65) Prior Publication Data
US 2024/0400369 A1 Dec. 5, 2024

(30) Foreign Application Priority Data
Sep. 15, 2021 (DE) ..................... 20 2021 104 980.4

(51) Int. Cl.
*B67D 3/00* (2006.01)

(52) U.S. Cl.
CPC ................................. *B67D 3/0041* (2013.01)

(58) Field of Classification Search
CPC .................................................... B67D 3/0041
USPC ............................................................... 141/1
See application file for complete search history.

(56) References Cited

U.S. PATENT DOCUMENTS 1,898,004 A * 2/1933 Demka ................ A23G 3/2023 99/450.8
3,058,614 A * 10/1962 Marasso .............. B65G 57/165 221/9
3,297,348 A * 1/1967 Griffiths .................. E05C 19/14 292/288
4,882,185 A 11/1989 Simelunas et al.
5,027,978 A * 7/1991 Roeser ..................... B29B 7/749 222/137
9,894,913 B2 2/2018 Beuchert et al.
11,104,461 B2 8/2021 Heaggans et al.
2006/0051476 A1* 3/2006 Fornaguera ............ A23G 3/203 426/516
2008/0311237 A1 12/2008 Steiner et al.
(Continued)

FOREIGN PATENT DOCUMENTS

DE 102005004785 A1 9/2006
DE 102022117498 A1 * 1/2024 ............ A47G 19/34
(Continued)

OTHER PUBLICATIONS

DE 102024106655 A1—English Translation (Year: 2025).*
(Continued)

*Primary Examiner* — Christopher M Afful
(74) *Attorney, Agent, or Firm* — Lerner David LLP

(57) ABSTRACT

A metering machine for filling free-flowing media into cavities of a mould that is to be filled is described. The metering machine has at least one independent metering unit which includes two dispensers, with a respective dedicated drive, and a nozzle unit. The nozzle unit is common to the two dispensers.

16 Claims, 4 Drawing Sheets

(56) References Cited

U.S. PATENT DOCUMENTS

Figure 1:
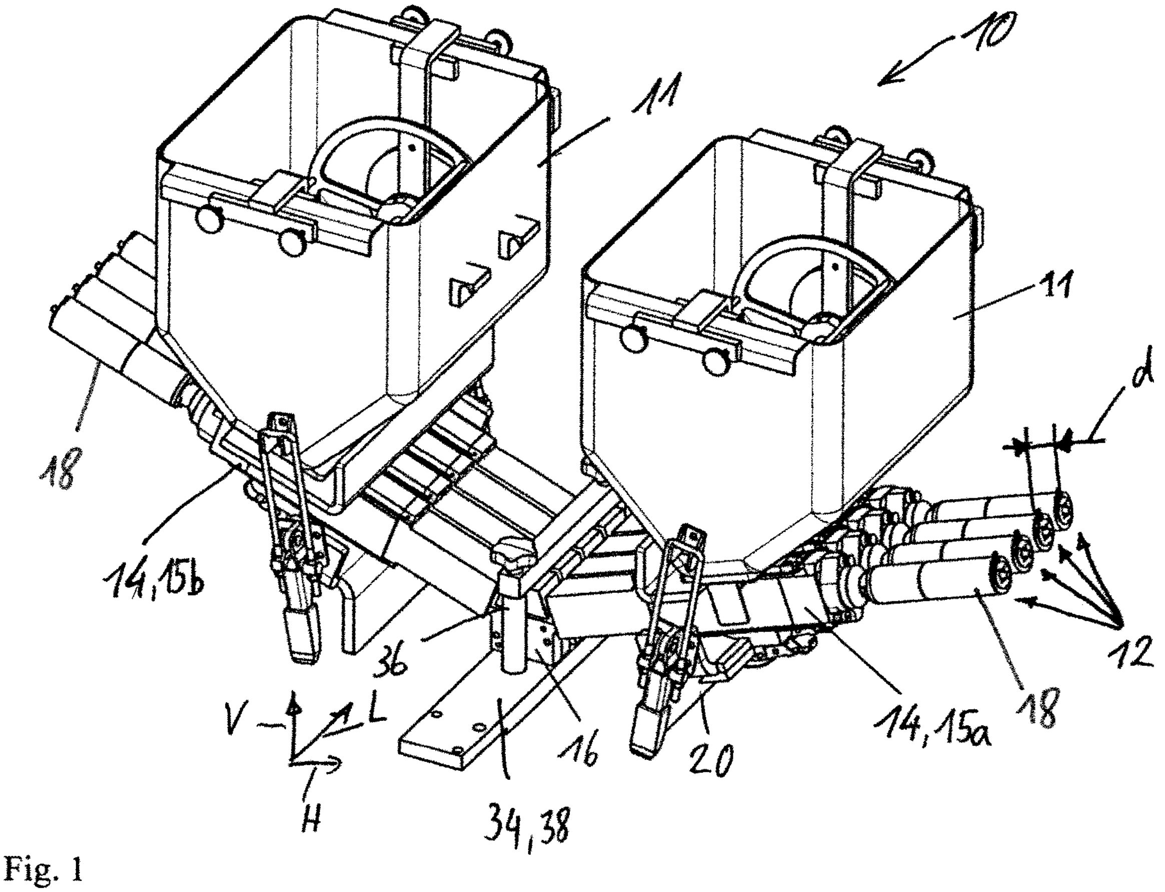

| | | | | |
|---|---|---|---|---|
| 2010/0163576 | A1* | 7/2010 | Boyden | A61K 9/1641 222/394 |
| 2016/0021911 | A1 | 1/2016 | Beuchert et al. | |
| 2016/0107133 | A1* | 4/2016 | Sugino | G01N 21/25 366/142 |
| 2019/0084706 | A1 | 3/2019 | Heaggans et al. | |
| 2020/0339403 | A1* | 10/2020 | Ricouard | B05B 7/2486 |

FOREIGN PATENT DOCUMENTS

| | | | | |
|---|---|---|---|---|
| DE | 102024106655 | A1 * | 9/2025 | B67C 3/206 |
| FR | 1185542 | A | 7/1959 | |

OTHER PUBLICATIONS

DE 102022117498 A1—English Translation (Year: 2024).*

"Moulds and Moulding: Examples and Techniques" PMCA Production Conference, Jan. 1, 1996 (Jan. 1, 1996), pp. 102-108, XP008082294.

International Search Report for Application No. PCT/EP2022/070084 mailed Feb. 8, 2023, 5 pages.

* cited by examiner

METERING MACHINE FOR FILLING FREE-FLOWING MEDIA INTO CAVITIES

CROSS-REFERENCE TO RELATED APPLICATIONS

The present application is a national phase entry under 35 U.S.C. § 371 of International Application No. PCT/EP2022/070084, filed Jul. 18, 2022, published in German, which claims priority to German Application No. 20 2021 104 980.4, filed Sep. 15, 2021, the disclosures of which are incorporated herein by reference in their entireties.

The present invention relates to a dosing machine for filling fluid media into cavities according to the general term of claim 1.

Current dosing machines consist of dosing lines and distributor plates with filling nozzles. The current solutions control all dosing lines per medium simultaneously with a common power unit. This does not allow any flexibility in terms of volume and output behavior. Due to the common power unit, in particular a common power train, the distances between the dosing lines are fixed. Different cavity distances of a mold to be filled are each realized via a corresponding manifold plate. The simultaneous control due to the common drive train means that the channel lengths within the manifold plate must be the same for each cavity. This makes the manifold plate costly and complex.

Due to the common drive train and design of the current dosing machines, the number of dosing lines is predetermined. This prevents flexible expansion of the pouring machine with regard to the number of cavities in the mold to be filled, which are fillable simultaneously.

In the existing dosing machines, the respective complete dosing unit with container is moved. The high weight of the entire unit leads to complex linear axis solutions. This means that 3-axis solutions are only appropriate for expensive high-end machines.

DE 10 2005 004 785 A1 shows a dosing machine for filling fluid media with a dosing line, wherein the composite dosing line comprises a first and a second dispenser with a piston drive, wherein the two dispensers are connected to a common distributor plate. The distributor plate comprises two separate nozzle units with identical flow channels in order to connect the first and the second dispenser to a first and a second nozzle unit respectively. It should be [2] emphasized that the two nozzle units are designed to fill separate cavities, whereby the fluid mass is fed from the first dispenser from a first container to a first cavity through a first nozzle unit. Accordingly, a second cavity is filled with the separate second nozzle unit. The common manifold plate presents the disadvantage that a distance between the nozzle units must be adapted to the distance between two cavities. Flexible adaptation to different molds is not possible. It is also not possible to extend a mold or extend the dosing line due to the design of the manifold plate and the piston-like drive train.

The purpose of the present invention is to provide a dosing machine which, while avoiding the problems known from the prior art, is particularly cost-effective to manufacture and/or operate and is configured to be flexibly expanded.

According to the invention, a dosing machine for filling fluid media into cavities of a mold to be filled is claimed, in particular for applications in the food or pharmaceutical industry, wherein the dosing machine comprises at least one independent dosing unit consisting of two dispensers, each with its own power unit, and a nozzle unit.

In other words, the dosing machine comprises at least one independent dosing unit with a first and a second dispenser, wherein the first dispenser and the second dispenser are each assigned a power unit, in particular a first and a second individual power unit, and wherein the first and the second dispenser are connected to a common nozzle unit.

Preferably, the dosing machine is used for filling fluid media into counter molds, containers or other cavities. Furthermore, the dosing machine consists of several dosing units as well as a handling system for positioning the mold to be filled with cavities. Each dosing unit comprises a nozzle unit to preferably fill a single cavity.

The invention has thus surprisingly recognized that different cavity spacings can be implemented quickly and easily. In particular, by using several independent dosing units, the distance between which is adjustable, the dosing machine is configured to be used for molds to be filled with different cavity distances.

Another advantage is that the dispensers are configured to be controlled individually via the single power unit. This flexibility means that each dispenser is configured to be used to dispense its own masses with different flow properties and/or to be combined with each other as required by individual control.

Preferably, the power unit of the dispenser, in particular the individual power unit, is designed as an eccentric screw pump in order to enable a continuous flow of the fluid medium. Further advantages of such progressive cavity pumps, especially compared to piston actuator systems, are that they do not require valves and are not limited in terms of the volume to be conveyed. In particular, the power units are configured to be individually adjusted in order to increase the reproducibility of a poured end product. Furthermore, the individual adjustment of the power units also allows nozzle units with differently dimensioned nozzle ducts to be used, whereby deviating flow resistances in the nozzle ducts can be compensated for by the individual power units.

Another advantage is that the number of dosing units can be extended as required.

In a particularly preferred embodiment, the at least one dispensing unit comprises a common nozzle unit with two coaxially arranged nozzle ducts in order to fill two fluid media, in particular two different fluid media, into the mold by means of the two dispensers in a coextrusion process. Preferably, a first fluid medium is filled into the first dispenser and a second fluid medium is filled into the second dispenser, each of which is assigned to one of the nozzle ducts. Advantageously, such a dosing unit is configured to be used to fill the cavity with two fluid media, one inside the other. It is preferred that the first fluid medium flowing through an outer nozzle duct fills the inner walls of the cavity and that the second fluid medium flowing through an inner nozzle duct forms a core or a filling within the first fluid medium. In particular, such a dosing unit is configured to be used to produce a multi-layered product, for example a filled praline. In particular for coextrusion processes, the power unit of the dispenser is preferably designed as an eccentric screw pump in order to also convey different fluid media. Advantageously, a conveying volume and/or a volume throughput can be easily adjusted with such a power unit in order to be able to precisely adjust preferably layers of a product, in particular also very thin outer layers. Further preferably, as already described above, different flow resistances of the nozzle ducts can be compensated by individual control of the progressive cavity pump. Very preferably, the dosing machine comprises a corresponding control unit to control the power units according to the flow channels and/or fluid media used.

Particularly preferably, the common nozzle unit of the two dispensers comprises a casing with two separable casing elements, in particular along a vertical place of the nozzle unit, in order to allow access to nozzle ducts. Very preferably, the two casing elements are separable along a symmetry plane. Advantageously, when the casing is open, the nozzle ducts are configured to be cleaned particularly easily and nozzle inserts are configured to be inserted or replaced within the nozzle ducts.

The nozzle ducts within the nozzle unit are preferably designed in such a way that an angle between individual duct sections is less than 90°, particularly preferably less than 60°. With such an arrangement of the flow channels, fluid media with different viscosity properties can be conveyed in a nozzle unit. In other words, advantageously, no change to nozzle units with adapted channel geometry is required for the use of fluid media with different viscosities.

Preferably for coextrusion processes, two insert elements are formed in the nozzle unit, which interlock coaxially in the assembled state. Particularly preferably, the nozzle ducts of the nozzle unit comprise an annular groove at a transition to the insert elements in order to fix and/or seal the insert elements in the direction of flow. The insert elements preferably comprise a reinforced wall thickness at one end, in particular for engagement in the casing of the nozzle unit. At the other end, the insert elements are preferably tapered with a thinner wall thickness, in particular to enable coaxial engagement. Preferably, an inner insert element comprises end-side support projections on an outer side of the inner insert element to enable guidance and alignment of the inner insert element within the outer insert element.

In another preferred embodiment, additional dosing units are configured to be added depending on the size of the machine due to the self-sufficient operation of the dosing units. This is possible in particular because the dosing units with dispensers are not connected to a common distribution plate. Several dosing units, each with a nozzle unit, are configured to be arranged next to each other. Preferably, a distance between the dosing units are also configured to be easily adjusted in this way.

A particularly preferred number of dosing units arranged next to each other is between 1 and 7 or 1 and 9.

Particularly preferably, the nozzle unit comprises two lateral inlet sections for receiving the dispensers. Preferably, an outlet section of the nozzle unit is formed along a vertical direction, in particular in the gravity direction. The inlet sections are preferably aligned in such a way that the dispensers can be arranged on the nozzle unit with an extension axis at an angle, preferably between 15° and 30°, above a horizontal plane. This results in particular in a spread or V-shaped arrangement of the dispensers on the nozzle unit. Preferably, a mass flow within the dosing unit can thus be favored by means of gravity in the direction of the outlet section.

Furthermore, the dosing unit with the two dispensers is configured to preferably be arranged and/or designed mirror-symmetrically with respect to a symmetry plane. In particular, the dispensers are preferably designed identically in order to simplify replacement and/or expansion. Preferably, the dosing machine is thus constructed as a modular system and easily adapted to different molds.

Furthermore, in this context, the inlet sections are preferably arranged in such a way that the extension axes of the dispensers are aligned parallel to a vertical place of the nozzle unit. Advantageously, the dosing unit can thus be designed in a particularly space-saving manner. In addition, several dosing units can be arranged next to each other, in particular directly next to each other, along a longitudinal direction of the dosing machine, in particular in the normal direction to the vertical place, in a particularly space-saving manner.

In addition, it is conceivable that dosing units arranged in pairs next to each other comprise differently aligned dispensers, in particular with a different angle above the horizontal plane of the nozzle unit, in order to enable at least partial overlapping along the longitudinal direction and an even more space-saving arrangement of several dosing units in relation to each other. Advantageously, the dosing machine with such an arrangement can comprise more dosing units while retaining the same installation space.

Further preferably, several dispensers are configured to be connected to a common fluid container in order to be able to feed a fluid medium to several dispensers of different dosing units simultaneously in a simple manner. Particularly preferably, the dosing machine comprises at least one container which is aligned along the longitudinal direction of the dosing machine and is connected to dispensers of at least two dosing units arranged next to one another along the longitudinal direction. Very preferably, a first container is connected to several first dispensers and a second container is connected to several second dispensers of different dosing units in order to be able to carry out a parallel coextrusion with two, in particular two different, fluid media, preferably by means of several dosing units.

Particularly preferably, the dispensers are configured to be removed from the dosing machine with a tension lock without tools and dismantled for cleaning. Advantageously, the number of dosing units of the dosing machine can also be adapted particularly easily and in a short time, especially in order to adapt the dosing machine flexibly to varying molds with different numbers and/or distances of cavities.

Preferably, the distances between the dosing units can be easily adapted to the cavity spacing. Particularly preferably, the dosing units are each arranged with a nozzle unit on an assembly element corresponding to the cavity spacing, with a clamp fixing the dosing units in the assembled state. The assembly element can preferably be designed as an assembly plate and/or at least one guide rod which, in the assembled state, arranges the nozzle units of the dosing units at a distance from one another. Particularly preferably, the assembly element described above is configured to comprise predefined positioning recesses in order to accommodate the dosing units in a form-fitting manner. Alternatively or additionally, it may be preferred that the nozzle units are slidably arranged on the at least one guide rod. By moving them along the longitudinal direction, a distance between the dosing units can be varied and adapted to the cavity spacing of a mold to be filled.

It is also preferred that the connection of the dispenser to the container can be adapted to the varying distances of the dosing units. For this purpose, the dosing unit particularly preferably comprises a connecting element, in particular a connecting hose, in order to bridge an offset between a filling opening of the dosing unit and a filling opening of the container.

In a further preferred embodiment, the mold to be filled with cavities can be moved in 3 axes, in particular by means of the aforementioned handling system, especially preferably a 3-axis gantry, which in combination with the individually controllable dispensers allows any number of possible combinations.

Preferably, the mold or container to be filled is configured to be removed from a removal position, filled in the machine and placed on a deposit position. The deposit or removal position is configured to be positioned flexibly thanks to the 3-axis gantry.

Preferably, different counter molds, containers or other cavities are configured to be processed in different sizes by means of automatically adjustable stoppers. Preferably, the deposit or removal station comprises two deposit units with stoppers that are configured to be adjusted horizontally relative to each other in order to fix the mold resting on the deposit units by means of the stoppers, in particular laterally.

Advantageously, at least one of the deposit and/or removal stations is equipped with a vibrating unit and/or a heating station.

It is particularly preferable that all three axes mentioned above are also configured to be covered in compact basic machines. In other words, a stationary dosing machine is advantageously configured to be used by using a 3-axis gantry for positioning the deposit and/or removal station. A complex and cost-intensive movement device for the dosing machine itself, in particular for a pouring head of the dosing machine, is therefore not required.

Preferably, a combination of the aforementioned embodiments enables a high degree of flexibility and thus new application possibilities for said dosing machines.

Further, the invention also relates to a method for operating a dosing machine, in particular a dosing machine as described above, wherein the dosing machine comprises at least one independent dosing unit, which comprises two dispensers, each with its own power unit, and a nozzle unit, and wherein fluid media are filled into the two dispensers and extruded by means of the power units through the nozzle unit into a cavity within a mold. In a preferred embodiment of the method, the common nozzle unit of the two dispensers comprises two coaxially arranged nozzle ducts, wherein two fluid media are filled into the mold by using a coextrusion process.

Preferably, the dosing machine described above is configured to be used for filling processes in the food or pharmaceutical industry. Especially for small batch products, the dosing machine represents a cost-effective and at the same time precise filling option, which is also easy to clean, replaceable and flexibly expandable, especially in comparison to large systems.

Further advantages and details of the invention can be seen from the following description of preferred embodiments of the invention and from the merely schematic drawings.

Figure 2A:
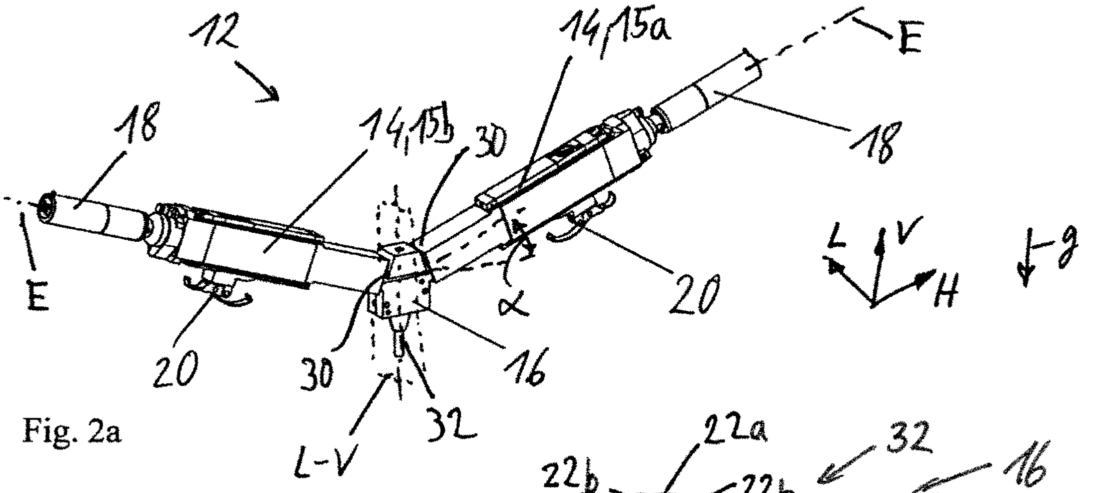
Figure 2B:
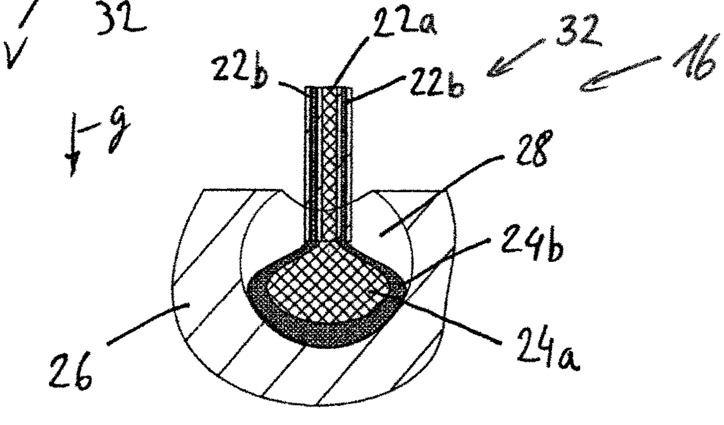
Figure 3:
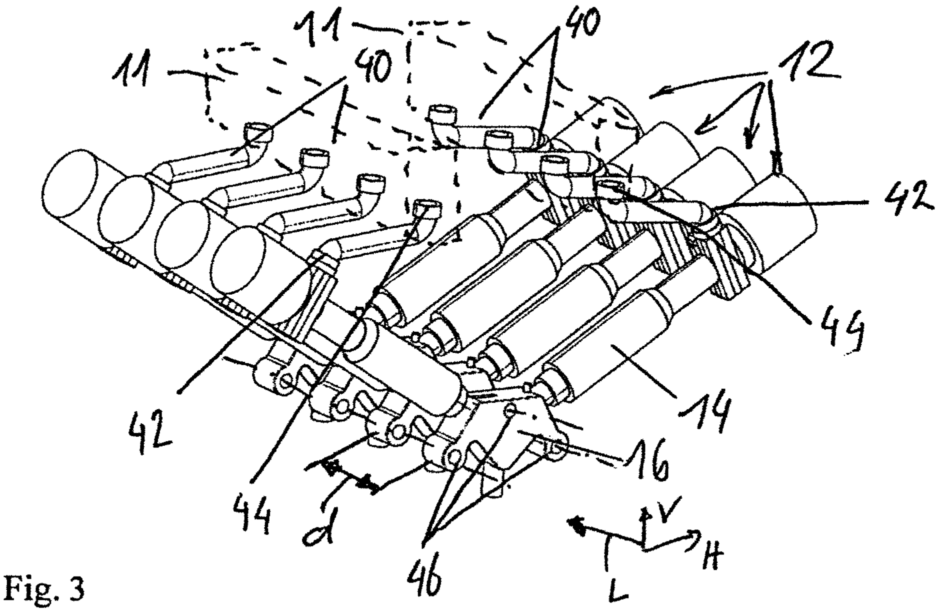
Figure 4:
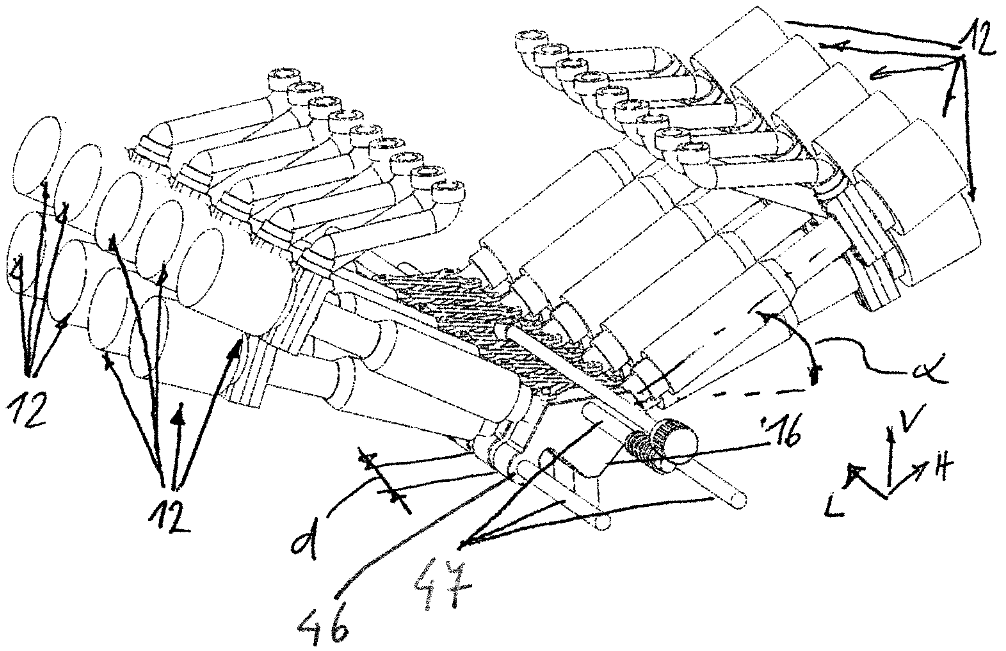

It shows:

FIG. 1: A perspective view of the complete dosing system,

FIG. 2*a*: A perspective view of a self-contained dosing unit,

FIG. 2*b*: A cross-sectional view of a mold with cavity to be filled,

FIG. 3: A perspective view of spread dosing units,

FIG. 4: A perspective view of spread dosing units arranged at an angle to each other, FIGS. 5*a*-5*d*: Views of a nozzle unit casing in the open state, FIG. 6*a*: A perspective view of a gantry with 3-axis and universal gripper, FIG. 6*b*: A detailed view of a cavity as shown in FIG. 4*a*, FIG. 7*a*, 7*b*: Mold gripper for different mold formats.

Identical elements or elements with the same function are marked with the same reference numbers in the figures.

FIG. 1 shows a complete dosing system with container 11 and dosing units 12 consisting of dispenser 14 with dispenser power unit 18 and nozzle unit 16. In particular, FIG. 1 shows a dosing machine 10 with several, in particular four, dosing units 12 aligned parallel to one another along a longitudinal direction L. The dosing machine 10 shown is merely an exemplary embodiment, whereby the number of dosing units 12 and/or a distance d along the longitudinal direction L between the dosing units 12 can be varied as desired. In particular, the dosing unit 12 can thus be adapted to a mold 26 with cavities 28 to be filled, for example as shown in FIG. 6*a*. In particular, the distance d can be adapted to the cavity spacing f shown in FIG. 6*b*.

Such a variation of the dosing machine 10 is possible in particular because the dosing units 12 with dispensers 14 are not connected to a common distribution plate for simultaneously filling several cavities 28. Preferably, the dosing unit 12 with two dispensers 14 comprises a nozzle unit 16 for filling a single cavity 28, whereby several dosing units 12 are configured to be connected to one another according to the modular principle as shown in FIG. 1 for simultaneously filling several cavities 28.

The dosing unit 12 in FIG. 2*a* shows a self-sufficient unit consisting of dispenser 14 with nozzle unit 16 and the dispenser power unit 18, as well as tension locks 20 for easy assembly and disassembly. Preferably, the dosing unit 12 comprises two dispensers 14, in particular a first and a second dispenser 15*a*, 15*b*, each with independent power units 18, the two dispensers 14 being connected to the common nozzle unit 16.

Particularly preferably, the nozzle unit 16 according to FIG. 2*a* comprises two lateral inlet sections 30 for receiving the dispensers 14. Preferably, an outlet section 32 of the nozzle unit 16 is formed along a vertical direction V, in particular in the gravity direction g. The inlet sections 30 are preferably aligned in such a way that the dispensers 14 can be arranged with an extension axis E at an angle a, in particular between 15° and 30°, above a horizontal plane H-L on the nozzle unit 16. This results in particular in a splayed or V-shaped arrangement of the dispensers 14 on the nozzle unit 16. Preferably, a mass flow within the dosing unit 12 can thus be favored by means of gravity g in the direction of the outlet section 32.

In this context, the dosing unit 12 with the two dispensers 14 can preferably be arranged and/or designed with mirror symmetry with respect to a symmetry plane L-V of the dosing unit 12. Preferably, the two dispensers 14 are designed as identical components in order to simplify replacement and/or expansion as shown in FIG. 1. Furthermore, in this context, the inlet sections 30 are preferably arranged such that the extension axis E of the dispensers 14 are aligned parallel to a vertical place V-H of the nozzle unit 16. Advantageously, the dosing unit 12 can thus be designed in a particularly space-saving manner.

As FIG. 1 further shows, several dosing units 12 are configured to be arranged along the longitudinal direction L, in particular in the normal direction to the vertical place V-H, in a particularly space-saving manner with the distance d next to each other, in particular also directly next to each other.

Figure 6A:
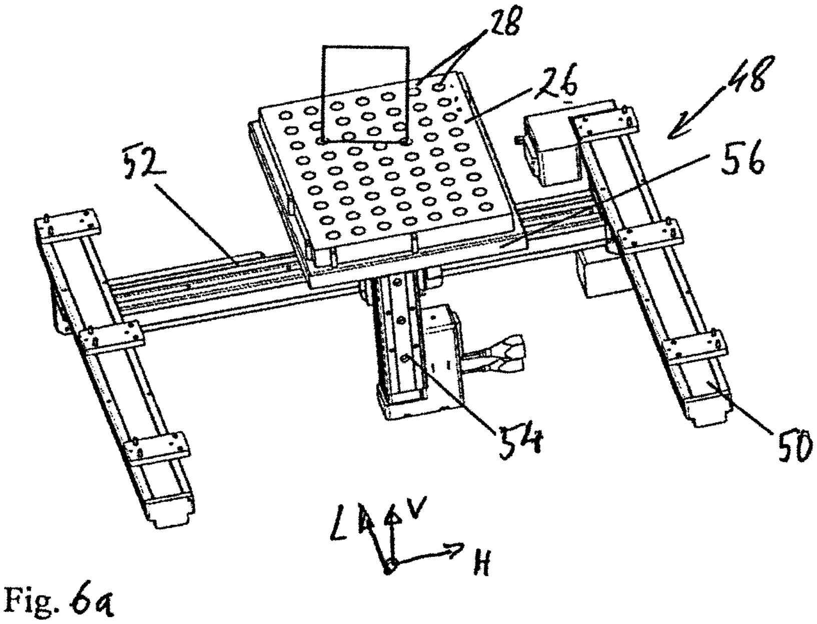
Figure 6B:
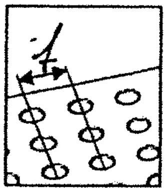
Figure 7A:
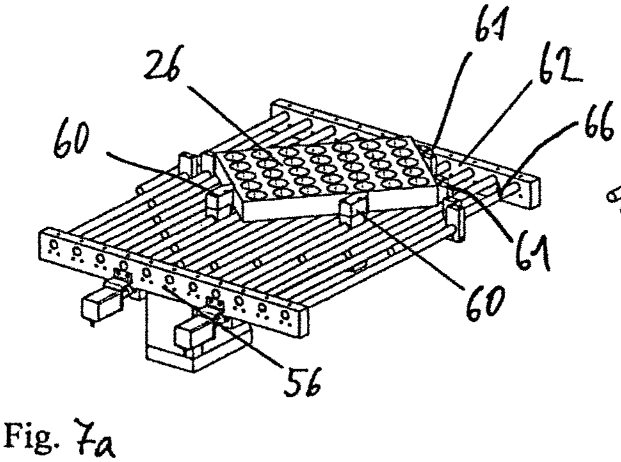
Figure 7B:
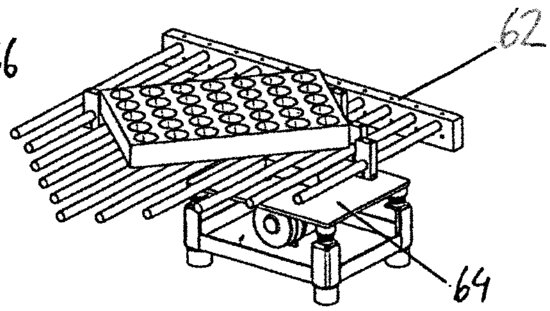

Particularly preferably, the dosing units 12 are each arranged with a nozzle unit 16 on an assembly element 34, in particular corresponding to a distance f of the cavities 28 of the mold 26 to be filled, for example shown in FIG. 6*b*, wherein preferably a clamp 36 fixes the dosing units 12 in the assembled state. In FIG. 1, the assembly element 34 is preferably designed as an assembly plate 38 which, in the assembled state, arranges the nozzle units 16 of the dosing units 12 at a distance from one another.

Advantageously, by means of the tension lock 20, the number of dosing units 12 and/or a distance d between dosing units 12 of the dosing machine 10 can be adjusted particularly easily and in a short time, in particular in order to adapt the dosing machine 10 in a flexible manner to varying molds 26 with different numbers of cavities and/or distances f.

According to FIG. 1, the dosing machine 10 preferably further comprises two fluid media containers 11, which are connected along the longitudinal direction L to several dosing units 12 in order to feed fluid media to the dispensers 14 of the dosing units 12. Preferably, one container 11 is connected to each of the first dispensers 14, 15*a* and another container 11 is connected to each of the second dispensers 14, 15*b* of the plurality of dosing units 12. Preferably, a medium can thus be fed simultaneously to several dispensers 14 in a particularly simple manner.

A particularly preferred embodiment of the nozzle unit 16 with two coaxially arranged nozzle ducts 22*a*, 22*b* is shown in FIG. 2*b* in order to fill two fluid media 24*a*, 24*b*, in particular two different fluid media 24*a*, 24*b*, into a cavity 28 within the mold 26 in a coextrusion process by means of the two dispensers 14. Preferably, a first fluid medium 24*a* is filled into the first dispenser 14, 15*a* and a second fluid medium 24*b* is filled into the second dispenser 14, 15*b*, wherein the dispensers 15*a*, 15*b* are each associated with one of the nozzle ducts 22*a*, 22*b*. It is preferred that the first fluid medium 24*b* flowing through an outer nozzle duct 22*b* fills inner walls of the cavity 28 and that the second fluid medium 24*a* flowing through an inner nozzle duct 22*a* forms a core or a filling within the first fluid medium 24*a*. In particular, such a dosing unit 12 are configured to be used to produce a multi-layered product, for example a filled praline. In this context, it is also preferred that the two fluid media 24*a*, 24*b* are each fed to the two dispensers 14, 15*a*, 15*b* through the two containers 11 as shown in FIG. 1.

A splayed dosing unit 12 in FIG. 3 shows flexible connections or connecting elements 40 between the dosing unit 12 and the dispenser 14 as well as variably adjustable nozzle units 16. Particularly preferably, an offset between a filling opening 42 of the dosing unit 12 and a filling opening 44 of the nozzle unit 16 can be bridged by means of the connecting element 40, in particular a connecting hose. The flexible connection 40 is particularly advantageous for varying distances d between several dosing units 12.

As an alternative or in addition to the assembly element 34 shown in FIG. 1 for fixing a plurality of dosing units 12, it may be preferred according to FIG. 3 that the nozzle unit 16 of the dosing units 12 each comprises at least one guide hole 46, preferably the three guide holes shown. Preferably, at least one guide rod 47 is configured to be arranged through this at least one guide hole 46 in order to align the dosing units 12 with one another. By displacement along the longitudinal direction L, the distance d between the dosing units 12 can then be varied along the at least one guide rod 47 and adapted to a cavity distance f, in particular according to FIG. 6*b*, of a mold 26 to be filled.

A particularly compact embodiment of the dosing machine 10 is shown in FIG. 4, wherein dosing units 12 arranged in pairs next to one another comprise differently aligned dispensers 14, in particular with a different angle a above the horizontal plane H-L of the nozzle unit 12, in order to enable at least partial overlapping along the longitudinal direction L and an even more space-saving arrangement of several dosing units 12 relative to one another.

In FIG. 5*a* to FIG. 5*d*, a preferred embodiment of the common nozzle unit 16 is shown in detail. Particularly preferably, the nozzle unit 16 comprises a casing 70 with two separable casing elements 71*a*, 71 *b* to allow access to the nozzle ducts 22*a*, 22*b* of the nozzle unit 16. Most preferably, the two casing elements 71*a*, 71*b* are designed to be separable along or parallel to the vertical place V-H of the dosing unit 12, preferably separating the nozzle ducts 22*a*, 22*b* along a duct axis T. Furthermore, the two casing elements 71*a*, 71*b* are separable along a symmetry plane.

Figure 5A:
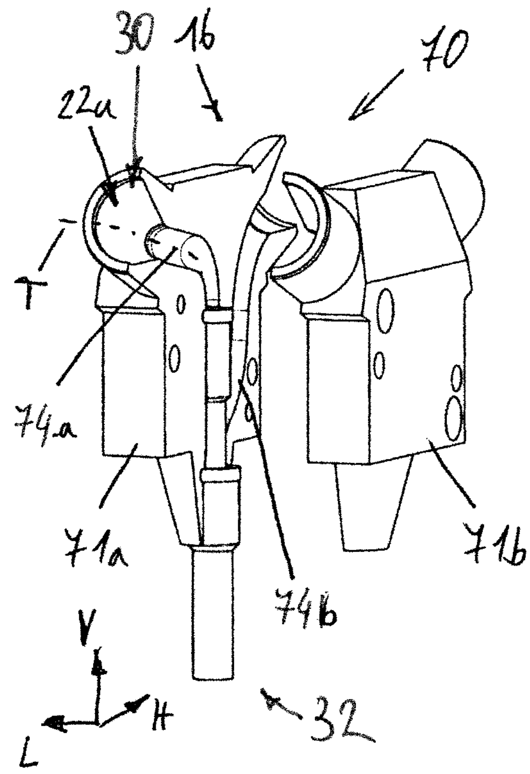
Figure 5B:
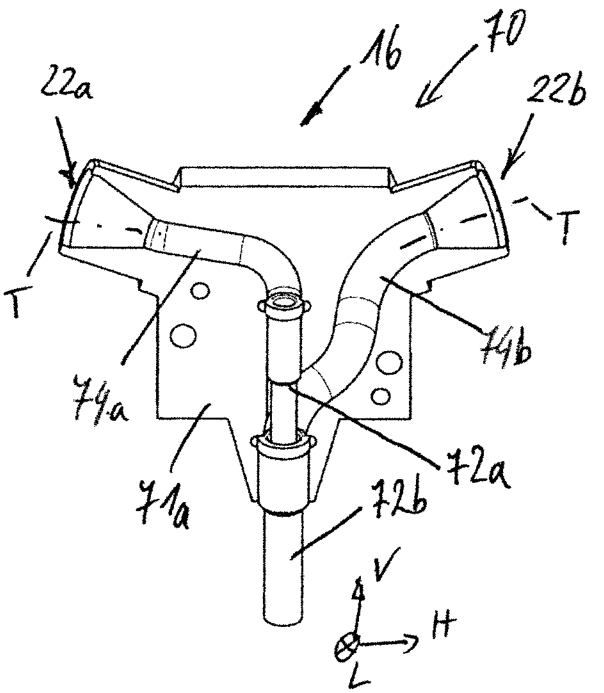

In particular in FIG. 5*a* and partially in FIG. 5*b*, the two casing elements 71*a*, 71 *b* are shown in an open state. It can be seen that in the open state of the casing 70, the nozzle ducts 22*a*, 22*b* are exposed and can thus be cleaned particularly easily. Further shown in detail is the inlet section 30 for receiving the dispenser 14 as shown in FIG. 2*a* and the outlet section 32 for dispensing the fluid media 24*a*, 24*b*, in particular as shown in FIG. 2*b*.

The nozzle ducts 21 *a*, 21 *b* shown in FIG. 5*b*, in particular two inlet ducts 74*a*, 74*b*, within the nozzle unit 16 are preferably designed such that an angle between individual duct sections, in particular an angle of curvature along the duct axis T, is less than 90°. With such an arrangement of the nozzle ducts 22*a*, 22*b*, the fluid media 24*a*, 24*b* shown in FIG. 2*b* can also be conveyed in the nozzle unit 16 with possibly different viscosity properties, in particular without viscosity properties significantly influencing an extrusion behavior.

Figure 5C:
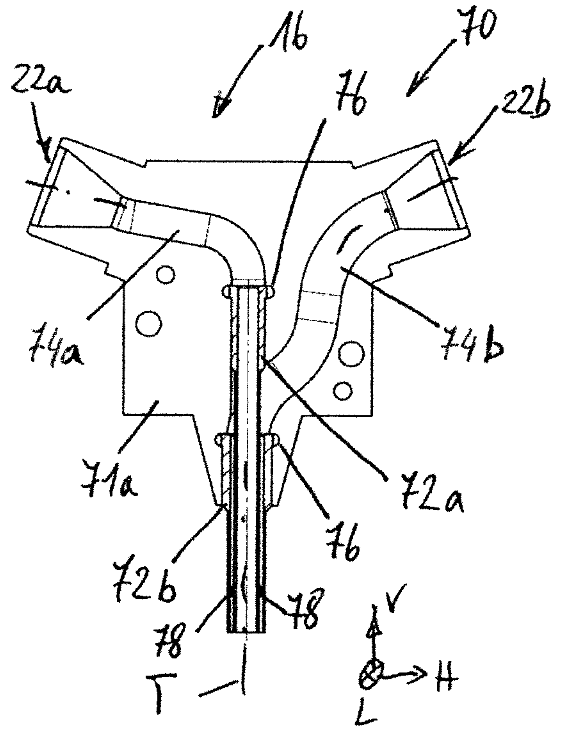
Figure 5D:
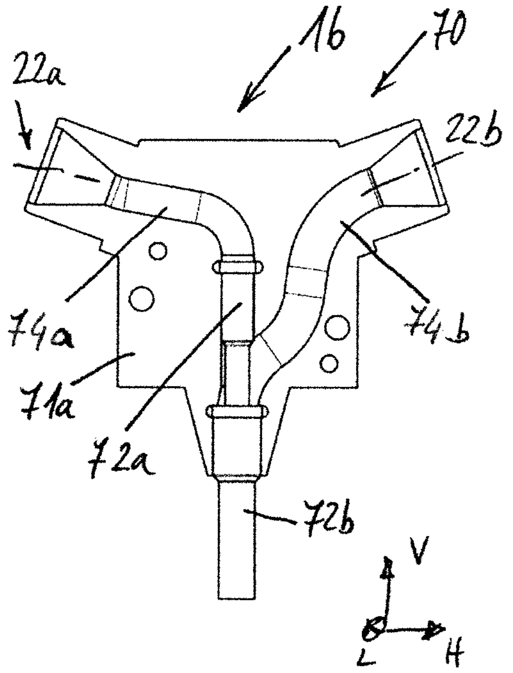

As shown in FIG. 5*c* and FIG. 5*d*, two insert elements 72*a*, 72*b* are used within the nozzle unit 16 to ensure coextrusion through the two nozzle ducts 22*a*, 22*b*. In particular, due to the possibility of the separable casing 70, the insert elements 72*a*, 72*b* can be inserted or exchanged in two inlet ducts 74*a*, 74*b* of the nozzle ducts 22*a*, 22*b*. To form the two coaxially arranged nozzle ducts 22*a*, 22*b*, an inner insert element 72*a* engages along the duct axis T in an outer insert element 72*a*, 72*b*. To accommodate the insert elements 72*a*, 72*b*, the nozzle ducts 22*a*, 22*b*, in particular the inlet ducts 74*a*, 74*b*, of the nozzle unit preferably comprise an annular groove 76 at a transition to the insert elements 72*a*, 72*b* in order to fix and/or seal the insert elements 72*a*, 72*b* in the flow direction or along the duct axis T. The insert elements 72*a*, 72*b* preferably comprise a reinforced wall thickness at one end for engagement in the annular groove 76. At the other end, the insert elements 72*a*, 72*b* are preferably tapered with a thinner wall thickness, in particular to enable coaxial engagement. Preferably, an inner insert element 72*a* comprises end support protrusions 78 on an outer side of the inner insert element 72*a* to enable guidance and alignment of the inner insert element 72*a* within the outer insert element 72*b*.

It should also be emphasized that the detailed view of FIG. 2*b* shows a nozzle duct, in particular an outlet section 32, enlarged according to FIG. 5*c* and FIG. 2*a*, whereby it is clear from a comparison of FIG. 2*b* with FIG. 5*c* that the outer nozzle duct 22*b* is formed between the inner and outer insert elements 72*a*, 72*b*. The inner nozzle duct 22*a*, on the other hand, is formed directly by the inner insert element 72*a*.

Furthermore, it can be seen in particular from FIG. 5*c* that a length and a flow cross-section of the nozzle ducts 22*a*, 22*b*, in particular of the inlet ducts 74*a*, 74*b*, can be designed differently and these ducts can also differ with regard to a flow resistance for implementing a coextrusion. Preferably, to compensate for such a flow resistance, the dispenser 14 is used with different power units 18, in particular progressive cavity pumps. Advantageously, such power units 18 can individually convey a fluid medium within a dispenser 14 and thus compensate for different flow resistances and/or viscosities, and/or set desired outlet volumes for a layer to be extruded.

In FIG. 6*a*, an exemplary mold 26 with several cavities 28 is shown, wherein a cavity spacing f is shown enlarged in FIG. 6*b*. The gantry 48 shown in FIG. 6*a* comprises an X-axis 50 for left-right movement, in particular along the longitudinal direction L, a Y-axis 52 for movement in depth, in particular the horizontal direction H, and a Z-axis 54 for height, in particular the vertical direction V. A universal gripper 56 is mounted on the Z-axis 54 in order to grip the mold 26, receptacle or other cavity to be moved. The cavity spacing f shown in detail in FIG. 6*b* may vary depending on the mold 26 or receptacle.

The universal gripper 56 in FIG. 7*a* and FIG. 7*b* shows a more complex embodiment, which enables the receptacles/molds 26 to be removed and deposited. The adjustable stoppers 60 allow different sizes of receptacles/molds 26 to be gripped.

Preferably, a deposit or removal station 62 comprises two deposit units with stoppers 60 which are configured to be adjusted horizontally relative to one another, wherein one of the deposit units is preferably designed as a universal gripper 56 for adjusting the stoppers 60 in order to fix the mold 26 resting on the deposit or removal station 62 against side stoppers 61, in particular laterally. As shown in FIG. 7*a*, a support surface 66 of the deposit or removal station 62 can preferably be formed by means of a plurality of rod bodies, wherein the rod bodies of the two deposit units interlock. The stoppers 60 are preferably formed as clamping pieces on the rod bodies. For fixing different molds 26, the stoppers 60, in particular also the side stoppers 61, are configured to preferably be adjusted along an extension axis of the bar bodies.

A deposit or removal station 62 may be provided with a vibrating unit 64, as shown in FIG. 7*b*.

LIST OF REFERENCE SYMBOLS

10 Dosing machine
11 Container
12 Dosing unit
14 Dispenser
15*a*, 15*b* first and second dispenser
16 Nozzle unit
18 Power unit
20 Tension lock
22*a*, 22*b* Two coaxial nozzle ducts
24*a*, 24*b* Two fluid media
26 Mold
28 Cavity
30 Inlet section
32 Outlet section
34 Assembly element
36 Clamp
38 Assembly plate
40 Connecting elements
42 Filling opening of the dosing unit
44 Filling opening of the container
46 Guide hole
47 Guide rods
48 Gantry
50 X-axis of the gantry
52 Y-axis of the gantry
54 Z-axis of the gantry
56 Universal gripper
60 Stopper
61 Side stopper
62 Deposit or removal station
64 Vibrating unit
66 Support surface
70 Casing of the nozzle unit
71*a,b* Casing elements
72*a, b* Inner and outer insert element
74*a*, 74*b* Inlet ducts
76 Annular groove d Distance between dosing units
E Extension axis of the dispenser
f Distance between cavities
g Gravity direction
L Longitudinal direction
V Vertical direction
H Horizontal direction
V-H Vertical place
H-L Horizontal plane
L-V Symmetry plane of the dosing unit
a Angle of dispenser to horizontal plane of nozzle unit
T Duct axis of the nozzle ducts

The invention claimed is:

1. A dosing machine for filling fluid media into cavities of a mold to be filled, wherein the dosing machine comprises a plurality of dosing units, each dosing unit comprising:
first and second dispensers, each having a corresponding power unit, and
a nozzle unit;
wherein the dosing machine further comprises an assembly element, the plurality of dosing units being each removably and slidably arranged with the nozzle unit on the assembly element at a distance corresponding to a spacing of the cavities to be filled, each dosing unit affixed to the assembly element by a clamp or tension lock.

2. The dosing machine according to claim 1, wherein each dosing unit comprises a common nozzle unit with first and second coaxially arranged nozzle ducts in order to fill first and second fluid media into a cavity of the mold by the first and second dispensers in a coextrusion process, wherein the power units of the first and second dispensers each comprises an eccentric screw pump.

3. The dosing machine according to claim 2, wherein the common nozzle unit of the first and second dispensers comprises a casing with first and second separable casing elements, along a vertical place (V-H) of the dosing unit, in order to allow access to the first and second nozzle ducts.

4. The dosing machine according to claim 1, wherein each dosing unit is configured as a self-sufficient dosing unit and the dosing machine is configured to comprise at least two or three self-sufficient dosing units.

5. The dosing machine according to claim 1, wherein the dosing machine is configured such that the first or second dispensers of the dosing units, are connected to a common container.

6. The dosing machine according to claim 1, wherein the first and second dispensers are configured in such a way that the first and second dispensers are dismantlable for cleaning purposes by the tension lock.

7. A method for operating a dosing machine according to claim 1, the method comprising:
filling fluid media into the first and second dispensers; and
extruding the fluid media by the power units through the nozzle unit into a cavity within the mold.

8. The dosing machine according to claim 1, wherein the dosing machine and/or the plurality of dosing units are/is configured in such a way that a connection of the dispensers to a container is adaptable to varying distances of the dosing units from one another.

9. The dosing machine according to claim 1, wherein the dosing machine and/or the plurality of dosing units are configured in such a way that the mold to be filled with cavities is movable in 3-axes.

10. The dosing machine according to claim 1, wherein the dosing machine and/or the plurality of dosing units are configured in such a way that the mold to be filled or a receptacle from a removal position is configured to be removed, filled in the dosing machine and deposited on a depositing position.

11. The dosing machine according to claim 1, wherein the dosing machine and/or the plurality of dosing units are configured in such a way that different counter moulds, receptacles or other cavities are configured to be processed in different sizes by automatically adjustable stoppers.

12. The dosing machine according claim 1, further comprising a deposit and/or removal station equipped with a vibrating unit and/or a heating station.

13. The dosing machine according to claim 6, wherein the first and second dispensers are removable from the dosing machine and/or dismantlable for cleaning without use of tools.

14. The dosing machine according to claim 1, wherein the assembly element comprised a plurality of predefined positioning recesses, in which the plurality of dosing units are accommodated in a form-fitting manner.

15. The dosing machine according to claim 1, wherein the assembly element is an assembly plate or at least one guide rod.

16. The method according to claim 7, wherein the nozzle unit of the first and second dispensers comprises first and second coaxially arranged nozzle ducts and wherein first and second fluid media are filled into the cavity within the mold by using a coextrusion process.

* * * * *